United States Patent
Guizilini et al.

(10) Patent No.: US 11,145,074 B2
(45) Date of Patent: Oct. 12, 2021

(54) SYSTEMS AND METHODS FOR DEPTH ESTIMATION USING MONOCULAR IMAGES

(71) Applicant: Toyota Research Institute, Inc., Los Altos, CA (US)

(72) Inventors: Vitor Guizilini, Santa Clara, CA (US); Rares A. Ambrus, San Francisco, CA (US); Sudeep Pillai, Mountain View, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 174 days.

(21) Appl. No.: 16/655,658

(22) Filed: Oct. 17, 2019

(65) Prior Publication Data
US 2021/0118163 A1    Apr. 22, 2021

(51) Int. Cl.
*G06T 7/579* (2017.01)

(52) U.S. Cl.
CPC .... *G06T 7/579* (2017.01); *G06T 2207/10028* (2013.01); *G06T 2207/20081* (2013.01)

(58) Field of Classification Search
None
See application file for complete search history.

(56) References Cited

U.S. PATENT DOCUMENTS

| 8,284,998 B2 | 10/2012 | Hu et al. |
| 9,398,313 B2 * | 7/2016 | Hannuksela ........... H04N 19/82 |
| 2015/0358612 A1 * | 12/2015 | Sandrew ............ H04N 13/128 |
| | | 348/36 |

(Continued)

FOREIGN PATENT DOCUMENTS

WO    2018119808 A1    7/2018

OTHER PUBLICATIONS

Bansal et al., Pixelnet: Representation of the pixels, by the pixels, and for the pixels. arXiv preprint arXiv:1702.06506, 2017.
(Continued)

*Primary Examiner* — Delomia L Gilliard
(74) *Attorney, Agent, or Firm* — Christopher G. Darrow; Darrow Mustafa PC

(57) ABSTRACT

System, methods, and other embodiments described herein relate to generating depth estimates of an environment depicted in a monocular image. In one embodiment, a method includes, in response to receiving the monocular image, processing the monocular image according to a depth model to generate a depth map. Processing the monocular images includes encoding the monocular image according to encoding layers of the depth model including iteratively encoding features of the monocular image to generate feature maps at successively refined representations using packing blocks within the encoding layers. Processing the monocular image further includes decoding the feature maps according to decoding layers of the depth model including iteratively decoding the features maps associated with separate ones of the packing blocks using unpacking blocks of the decoding layers to generate the depth map. The method includes providing the depth map as the depth estimates of objects represented in the monocular image.

20 Claims, 5 Drawing Sheets

(56) References Cited

U.S. PATENT DOCUMENTS

| | | | |
|---|---|---|---|
| 2017/0032222 | A1* | 2/2017 | Sharma .................. G06K 9/4619 |
| 2018/0231871 | A1 | 8/2018 | Wang et al. |
| 2019/0051057 | A1* | 2/2019 | Sommerlade ........... G06T 7/337 |
| 2020/0090359 | A1* | 3/2020 | Pillai ......................... G06T 7/50 |

OTHER PUBLICATIONS

Casser et al., Depth prediction without the sensors: Leveraging structure for unsupervised learning from monocular videos, found at: arXiv:1811.06152v1 [cs.CV] Nov. 15, 2018.

Badrinarayanan et al., Segnet: A deep convolutional encoder-decoder architecture for image segmentation. IEEE transactions on pattern analysis and machine intelligence, 39(12):2481-2495, 2017.

Cordts, et al., The cityscapes dataset for semantic urban scene understanding, In Proceedings of the IEEE conference on computer vision and pattern recognition, pp. 3213-3223, 2016.

Deng et al., Imagenet: A large-scale hierarchical image database, In Proceedings of the IEEE Conference on Computer Vision and Pattern Recognition, 2009.

Fischer et al., Flownet: Learning optical flow with convolutional networks. In Proceedings of the IEEE international conference on computer vision, pp. 2758-2766, 2015.

Eigen et al., Depth map prediction from a single image using a multi-scale deep network. In Advances in neural information processing systems, pp. 2366-2374, 2014.

Garg et al., Unsupervised cnn for single view depth estimation: Geometry to the rescue, In European Conference on Computer Vision, pp. 740-756. Springer, 2016.

Graham, Fractional max-pooling. found at: arXiv:1412.6071v4 [cs.CV] May 12, 2015.

Jaderberg et al., Spatial transformer networks. In Advances in neural information processing systems, pp. 2017-2025, 2015.

Kendall, et al., Multi-task learning using uncertainty to weigh losses for scene geometry and semantics, In Proceedings of the IEEE Conference on Computer Vision and Pattern Recognition, found at: arXiv:1705.07115v3 [cs.CV] Apr. 24, 2018.

Kingma et al., Adam: A method for stochastic optimization, found at: arXiv preprint arXiv:1412.6980, 2014.

Klodt et al., Supervising the new with the old: Learning sfm from sfm. In European Conference on Computer Vision, pp. 713-728. Springer, 2018.

Kolesnikov, et al. Revisiting selfsupervised visual representation learning, found at: arXiv:1901.09005v1 [cs.CV] Jan. 25, 2019.

Lee, et al., Generalizing pooling functions in convolutional neural networks: Mixed, gated, and tree, In International Conference on Artificial Intelligence and Statistics (AISTATS), 2016.

Lee et al., Spigan: Privileged adversarial learning from simulation. In ICLR, 2019.

Long et al., Fully convolutional networks for semantic segmentation. In Proceedings of the IEEE conference on computer vision and pattern recognition, pp. 3431-3440, 2015.

Mahjourian et al., Unsupervised learning of depth and ego-motion from monocular video using 3d geometric constraints, In Proceedings of the IEEE Conference on Computer Vision and Pattern Recognition, pp. 5667-5675, 2018.

Manhardt et al., Roi-10d: Monocular lifting of 2d detection to 6d pose and metric shape. arXiv preprint arXiv:1812.02781, 2018.

Mayer et al., A large dataset to train convolutional networks for disparity, optical flow, and scene flow estimation. In Proceedings of the IEEE Conference on Computer Vision and Pattern Recognition, pp. 4040-4048, 2016.

Michels et al., High speed obstacle avoidance using monocular vision and reinforcement learning, In Proceedings of the 22nd international conference on Machine learning, pp. 593-600. ACM, 2005.

Paszke et al., Automatic differentiation in pytorch, 31st Conference on Neural Information Processing Systems (NIPS 2017).

Poggi et al., Learning monocular depth estimation with unsupervised trinocular assumptions, found at: arXiv:1808.01606v1 [cs.CV] Aug. 5, 2018.

Ummenhofer et al., Demon: Depth and motion network for learning monocular stereo. In IEEE Conference on computer vision and pattern recognition (CVPR), vol. 5, p. 6, 2017.

Wang et al., Learning depth from monocular videos using direct methods. In Proceedings of the IEEE Conference on Computer Vision and Pattern Recognition, pp. 2022-2030, 2018.

Wang et al., Image quality assessment: from error visibility to structural similarity. IEEE transactions on image processing, 13(4):600-612, 2004.

Yang et al., Deep virtual stereo odometry: Leveraging deep depth prediction for monocular direct sparse odometry, arXiv preprint arXiv:1807.02570, 2018.

Yang et al., Every pixel counts: Unsupervised geometry learning with holistic 3d motion understanding, In European Conference on Computer Vision, pp. 691-709. Springer, 2018.

Yin et al., GeoNet: Unsupervised learning of dense depth, optical flow and camera pose, In Proceedings of the IEEE Conference on Computer Vision and Pattern Recognition (CVPR), vol. 2, 2018.

Yu et al., Dilated residual networks, In the IEEE Conference on Computer Vision and Pattern Recognition (CVPR), Jul. 2017.

Zhang et al., Hartley spectral pooling for deep learning, Computing Research Repository, abs/1810.04028, 2018.

Zhou et al., Unsupervised learning of monocular depth estimation with bundle adjustment, super-resolution and clip loss, arXiv preprint arXiv:1812.03368, 2018.

Zou et al., Df-net: Unsupervised joint learning of depth and flow using cross-task consistency, In European Conference on Computer Vision, 2018.

Godard, "Digging Into Self-Supervised Depth Estimation", found at: arXiv:1806.01260v4 [cs.CV] Aug. 17, 2019.

Godard et al., "Unsupervised monocular depth estimation with left-right consistency", found at: arXiv:1609.03677v3 [cs.CV] Apr. 12, 2017.

Geiger et al., "Vision meets robotics: The kitti dataset", The International Journal of Robotics Research, 32(11):1231-1237, 2013.

Pillai, et al., "Superdepth: Selfsupervised, super-resolved monocular depth estimation", Found at: arXiv:1810.01849, 2018.

Wu et al., "Group normalization", found at: arXiv:1803.08494v3 [cs.CV] Jun. 11, 2018.

Zhou et al., "Unsupervised learning of depth and ego-motion from video", In CVPR, vol. 2, p. 7, 2017.

He et al., "Deep residual learning for image recognition", found at: arXiv:1512.03385v1 [cs.CV] Dec. 10, 2015.

Shi et al., "Real-time single image and video super-resolution using an efficient sub-pixel convolutional neural network", found at: arXiv:1609.05158v2 [cs.CV] Sep. 23, 2016.

Srivastava et al., "Dropout: A simple way to prevent neural networks from overfitting", Journal of Machine Learning Research 15 (2014) 1929-1958.

Chen et al., "Trainable nonlinear reaction diffusion: A flexible framework for fast and effective image restoration", found at: arXiv:1508.02848v2 [cs.CV] Aug. 20, 2016.

Chen at al., "Trainable nonlinear reaction diffusion: A flexible framework for fast and effective image restoration", found at: arXiv:1508.02848v2 [cs.CV] Aug. 20, 2016.

Dong et al., "Image superresolution using deep convolutional networks", found at: arXiv:1501.00092v3 [cs.CV] Jul. 31, 2015.

Pillai et al., "Superdepth: Self-Supervised, Super-Resolved Monocular Depth Estimation", found at: arXiv:1810.01849v1 [cs.CV] Oct. 3, 2018.

Godard et al., "Digging Into Self-Supervised Monocular depth estimation", found at: arXiv:1806.01260v2 [cs.CV] Jun. 5, 2018.

Zhou et al., "Unsupervised Learning of Depth and Ego-Motion from Video", found at: arXiv:1704.07813v2 [cs.CV] Aug. 1, 2017.

N. Srivastava et al., "Dropout: A Simple Way to Prevent Neural Networks from Overfilling", Journal of Machine Learning Research, 2014, pp. 1929-1958.

(56) References Cited

OTHER PUBLICATIONS

Geiger et al., "Vision meets robotics: The kith dataset," The International Journal of Robotics Research, vol. 32, No. 11, pp. 1231-1237, 2013.

* cited by examiner

SYSTEMS AND METHODS FOR DEPTH ESTIMATION USING MONOCULAR IMAGES

TECHNICAL FIELD

The subject matter described herein relates, in general, to systems and methods for determining depths of a scene from a monocular image, and, more particularly, to using a depth model having packing and unpacking blocks that improve depth estimates.

BACKGROUND

Various devices that operate autonomously or that provide information about a surrounding environment use sensors that facilitate perceiving obstacles and additional aspects of the surrounding environment. For example, a robotic device uses information from the sensors to develop awareness of the surrounding environment in order to navigate through the environment and avoid hazards. In particular, the robotic device uses the perceived information to determine a 3-D structure of the environment in order to identify navigable regions. The ability to perceive distances through estimation of depth using sensor data provides the robotic device with the ability to plan movements through the environment and generally improve situational awareness about the environment. However, depending on the available onboard sensors, the robotic device may acquire a limited perspective of the environment, and, thus, can encounter difficulties in distinguishing aspects of the environment.

That is, various sensors perceive different aspects of the environment differently and also have different implementation characteristics. For example, LiDAR is effective at perceiving depth in the surrounding environment but suffers from difficulties such as high costs and can encounter errors in certain weather conditions. Moreover, other sensors, such as stereo cameras, function to capture depth information but also suffer from difficulties with cost, limited field-of-view, and so on. Additionally, while monocular cameras can be a cost-effective approach, the sensor data from such cameras does not explicitly include depth information. Instead, the robotic device implements processing routines that derive depth information from the monocular images.

However, leveraging monocular images to perceive depth can also suffer from difficulties such as limited resolution, image artifacts, difficulties with training the processing routines (e.g., expensive or limited availability of data), and so on. As such, many difficulties associated with determining depth data persist that may result in reduced situational awareness for a device, and, thus, difficulties in navigating or performing other associated functions.

SUMMARY

In one embodiment, example systems, and methods relate to an improved approach to generating depth information from monocular images. As previously noted, various devices may encounter difficulties perceiving aspects of the surrounding environment depending on which sensors the devices employ. That is, because of various intrinsic limitations in perceived data and/or the way in which the devices process the data, the devices may encounter circumstances in which a comprehensive determination of surrounding depths cannot be resolved.

Therefore, in one embodiment, a depth system is disclosed that improves the processing of monocular images to resolve depth estimates by implementing a machine learning model that uses a novel arrangement of encoding layers and decoding layers. In particular, the depth system implements a depth model having encoding layers configured with packing blocks and decoding layers configured with an arrangement of unpacking blocks. In general, the packing blocks, in one or more embodiments, function to replace, for example, striding and pooling layers in order to better retain additional details from the original monocular images. In one approach, the packing blocks better retain the information by, for example, packing encoded features into additional feature channels thereby capturing sub-pixel information as the depth model processes the monocular images. In other words, the packing blocks add additional dimensions to resolved intermediate feature maps in order to retain information in the feature maps as the depth model further processes and encodes the information across the encoding layers.

Accordingly, the unpacking blocks associated with the decoding layers can then function to further resolve spatial information (i.e., depth estimates) from the additionally packed data in the feature maps. Moreover, the encoding layers and the decoding layers function together to relay residual information (i.e., encoded spatial information in the form of intermediate feature maps) via skip connections between the separate blocks. As such, the unpacking blocks receive the residual information in order to retain a memory of the original packed features but also separately learning features through sub-pixel convolutions for detailed decoding at the separate decoding layers. In turn, the unpacking blocks further aggregate information across the decoding layers through a process of feature expansion to fully exploit packed spatial information. Thereafter, the depth model can, for example, super-resolve depth maps at various target dimensions to provide improved depth estimates. In this way, the depth system improves depth estimates by avoiding the noted difficulties and implementing the depth model in a robust manner to better generate high-resolution outputs.

In one embodiment, a depth system for generating depth estimates of an environment depicted in a monocular image is disclosed. The depth system includes one or more processors and a memory communicably coupled to the one or more processors. The memory stores a depth module including instructions that when executed by the one or more processors cause the one or more processors to, in response to receiving the monocular image, process the monocular image according to a depth model to generate a depth map. The depth module processes the monocular image by encoding the monocular image according to encoding layers of the depth model including iteratively encoding features of the monocular image to generate feature maps at successively refined representations using packing blocks within the encoding layers and decoding the feature maps according to decoding layers of the depth model including iteratively decoding the features maps associated with separate ones of the packing blocks using unpacking blocks of the decoding layers to generate the depth map. The memory stores an image module including instructions that when executed by the one or more processors cause the one or more processors to provide the depth map as the depth estimates of objects represented in the monocular image.

In one embodiment, a non-transitory computer-readable medium for generating depth estimates of an environment depicted in a monocular image and including instructions that when executed by one or more processors cause the one or more processors to process the monocular image according to a depth model to generate a depth map. The instructions include instructions to process the monocular image by encoding the monocular image according to encoding layers of the depth model including iteratively encoding features of the monocular image to generate feature maps at successively refined representations using packing blocks within the encoding layers. The instructions include instructions to process the monocular image by decoding the feature maps according to decoding layers of the depth model including iteratively decoding the features maps associated with separate ones of the packing blocks using unpacking blocks of the decoding layers to generate the depth map. The instructions include instructions to provide the depth map as the depth estimates of objects represented in the monocular image.

In one embodiment, a method for generating depth estimates of an environment depicted in a monocular image is disclosed. In one embodiment, the method includes, in response to receiving the monocular image, processing the monocular image according to a depth model to generate a depth map. Processing the monocular images includes encoding the monocular image according to encoding layers of the depth model including iteratively encoding features of the monocular image to generate feature maps at successively refined representations using packing blocks within the encoding layers. Processing the monocular image further includes decoding the feature maps according to decoding layers of the depth model including iteratively decoding the features maps associated with separate ones of the packing blocks using unpacking blocks of the decoding layers to generate the depth map. The method includes providing the depth map as the depth estimates of objects represented in the monocular image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
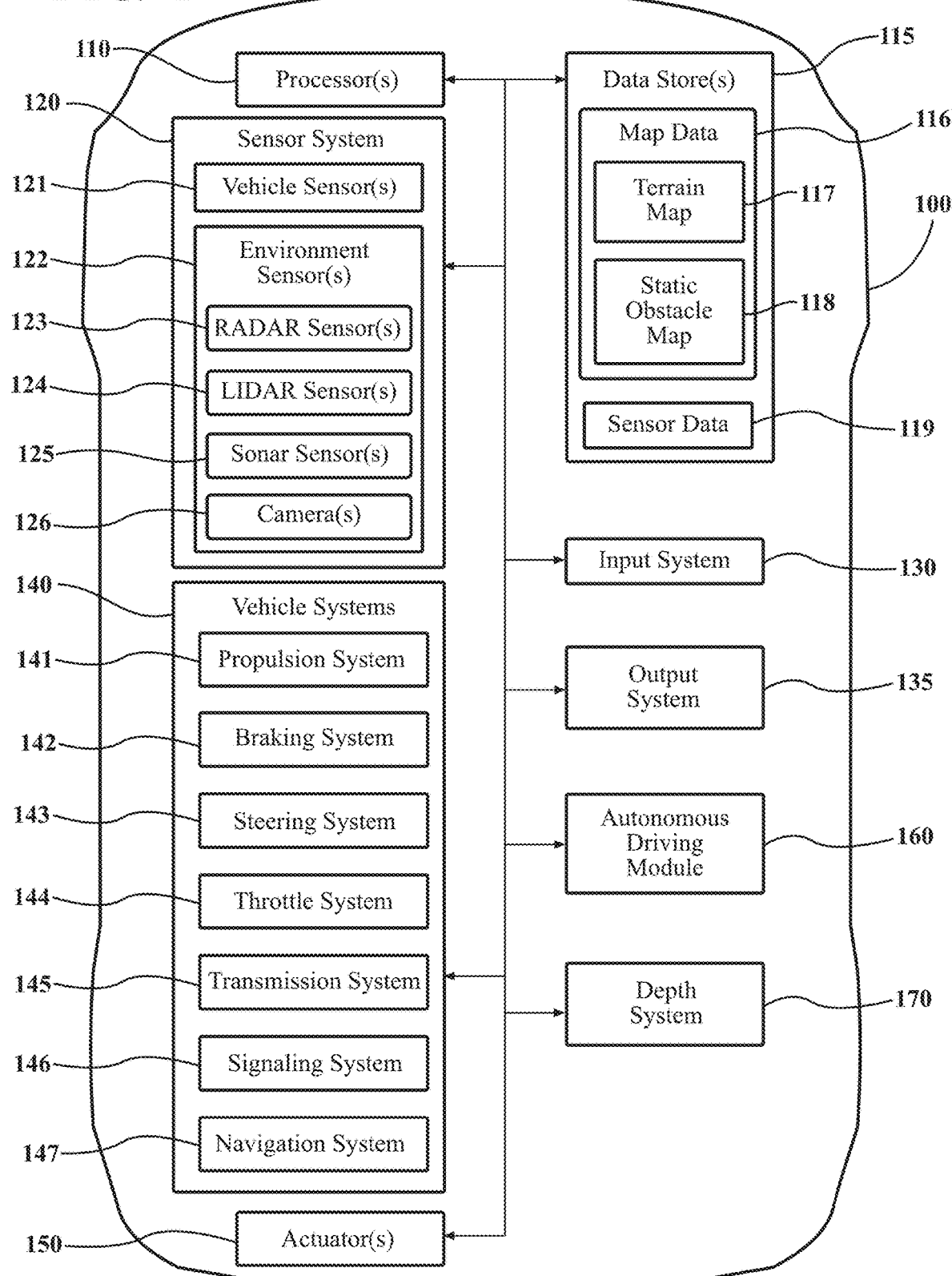
FIG. 1 illustrates one embodiment of a vehicle within which systems and methods disclosed herein may be implemented.

Systems, methods, and other embodiments associated with an improved approach to generating depth information from monocular images are disclosed herein. As previously noted, perceiving aspects of the surrounding environment can represent different challenges depending on which sensors a device employs to support the endeavor. In particular, difficulties with using monocular cameras to perceive depths in the surrounding environment can complicate the use of such sensors. That is, because a system trains and implements additional routines to derive the depth data from monocular images, difficulties can arise in relation to incomplete depth data and/or aberrations in the derived depth data from characteristics of the processing approach (e.g., edge artifacts, low-resolution). The difficulties can cause the depth estimates to be unreliable for resolving aspects of the environment, thereby resulting in an incomplete situational awareness of the environment and potentially being unable to perform tasks that rely on such data.

Therefore, in one embodiment, a depth system is disclosed that improves the processing of monocular images to resolve depth estimates by implementing a machine learning model that uses a novel arrangement of encoding layers and decoding layers to resolve the depth estimates in a high-resolution format. In particular, the depth system implements a depth model having encoding layers configured with packing blocks and decoding layers configured with an arrangement of unpacking blocks. In general, the packing blocks, in one or more embodiments, function to replace, for example, striding and pooling layers in order to better retain additional details from the original monocular images. In one approach, the packing blocks better retain the information by, for example, folding encoded features into additional feature channels as the depth model processes the monocular image and subsequent intermediate feature maps. In other words, the packing blocks add additional dimensions to resolved feature maps in order to retain information in the feature maps as the depth model further processes and encodes the information across layers thereby avoiding loss of information as in traditional approaches.

The unpacking blocks associated with the decoding layers function to further resolve spatial information (i.e., depth estimates) from the packed features in a final feature map and various intermediate feature maps. For example, the encoding layers and the decoding layers function together to relay residual information (i.e., encoded spatial information in the form of the intermediate feature maps) via skip connections between the separate blocks. As such, an unpacking block receives the residual information in order to retain a memory of the original packed features, which the unpacking block uses when unfolding feature channels into spatial information. The unpacking blocks generally include learned sub-pixel convolutions that provide for improved up-sampling of the encoded features and spatial information from previous layers to provide high-resolution outputs. Thus, the unpacking blocks aggregate information across the decoding layers through a process of feature expansion to fully exploit the packed spatial information. The depth model leverages the information at the separate decoding layers to, for example, super-resolve depth maps at various target dimensions to provide improved depth estimates. In this way, the depth system improves depth estimates from monocular images by avoiding the noted difficulties and implementing the depth model in a robust manner to better generate high-resolution outputs.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, proceeds through an environment according to assessed aspects of the environment, and thus benefits from the functionality discussed herein. In yet further embodiments, the vehicle 100 may be a statically mounted device, an embedded device, or another device that uses monocular images to derive depth information about a scene.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a depth system 170 that functions to process monocular images and provide depth estimates for an environment (e.g., objects, surfaces, etc.) depicted therein. Moreover, while depicted as a stand-alone component, in one or more embodiments, the depth system 170 is integrated with the autonomous driving module 160, the camera 126, or another component of the vehicle 100. The noted functions and methods will become more apparent with a further discussion of the figures.

Figure 2:
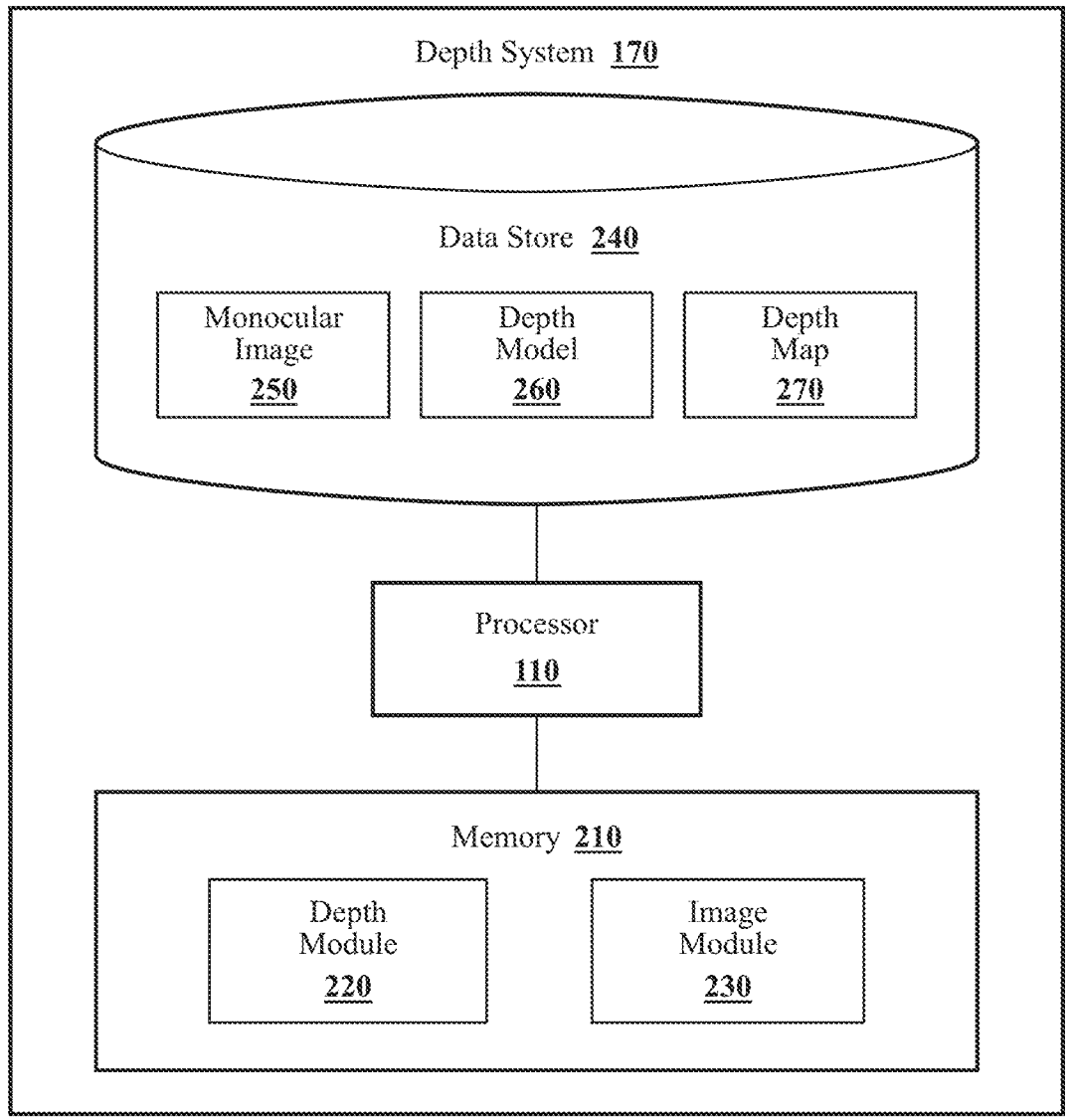
FIG. 2 illustrates one embodiment of a depth system that is associated with using monocular images to estimate depth in a surrounding environment.

With reference to FIG. 2, one embodiment of the depth system 170 is further illustrated. The depth system 170 is shown as including a processor 110. Accordingly, the processor 110 may be a part of the depth system 170 or the depth system 170 may access the processor 110 through a data bus or another communication path. In one or more embodiments, the processor 110 is an application-specific integrated circuit (ASIC) that is configured to implement functions associated with a depth module 220 and an image module 230. In general, the processor 110 is an electronic processor such as a microprocessor that is capable of performing various functions as described herein. In one embodiment, the depth system 170 includes a memory 210 that stores the depth module 220 and the image module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Furthermore, in one embodiment, the depth system 170 includes a data store 240. The data store 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes monocular image(s) 250, a depth model 260, and a depth map(s) 270 along with, for example, other information that is used by the modules 220 and 230.

The monocular image 250 is, for example, an image from the camera 126 that encompasses a field-of-view about the vehicle 100 of at least a portion of the surrounding environment. That is, the image 250 is, in one approach, generally limited to a subregion of the surrounding environment. As such, the image 250 may be of a forward-facing (i.e., the direction of travel) 60, 90, 120-degree FOV, a rear/side facing FOV, or some other subregion as defined by the characteristics of the camera 126. In further aspects, the camera 126 is an array of two or more cameras that capture multiple images of the surrounding environment and stitch the images together to form a comprehensive 360-degree view of the surrounding environment.

In either case, the image 250 itself includes visual data of the FOV that is encoded according to an image standard (e.g., codec) associated with the camera 126. In general, characteristics of the camera 126 and the image standard define a format of the image 250. Thus, while the particular characteristics can vary according to different implementations, in general, the image 250 has a defined resolution (i.e., height and width in pixels) and format. Thus, for example, the monocular image 250 is generally an RGB visible light image. In further aspects, the image 250 can be an infrared image associated with a corresponding infrared camera, a black/white image, or another suitable format as may be desired. Whichever format that the depth system 170 implements, the image 250 is a monocular image in that there is no explicit additional modality indicating depth. In contrast to a stereo image that may integrate left and right images from separate cameras mounted side-by-side, the monocular image 250 does not include explicit depth information such as disparity maps derived from comparing the stereo images pixel-by-pixel.

Instead, the monocular image 250 implicitly provides depth information in the relationships of perspective and size of elements depicted in the image 250 from which the depth module 220 derives the depth map 270 by using the depth model 260. The depth map 270 is, in one embodiment, a data structure corresponding to the image 250 that indicates distances/depths to objects/features represented therein. Thus, with reference to FIG. 3, one embodiment of the depth model 260 is illustrated. In particular, the illustrated form of the model 260 identifies an exemplary flow of a processing channel formed by the model 260 for processing monocular images such as image 250. It should be appreciated that the depth model 260 is generally a machine learning algorithm/model that may be broadly characterized as a convolutional neural network (CNN) or as an encoder/decoder architecture including convolutional components.

The monocular image 250 is provided as an input into the depth model 260. The depth model 260, in one embodiment, includes an encoder 300 that accepts the image 250 as an electronic input and processes the image 250 to extract features from the image 250. The features are, in general, aspects of the image that are indicative of spatial information that is intrinsically encoded therein. As such, encoding layers that form the encoder 300 function to fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image 250.

Accordingly, as will be discussed in greater detail subsequently, the encoder 300 is comprised of multiple encoding layers formed from a combination of two-dimensional (2D) convolutional layers, packing blocks, and residual blocks. Moreover, the separate encoding layers generate outputs in the form of encoded feature maps (also referred to herein as tensors), which the encoding layers provide to subsequent layers in the model 260. Thus, the encoder 300 includes a variety of separate layers that operate on the monocular image 250, and subsequently on derived/intermediate feature maps that convert the visual information of the monocular image 250 into embedded state information in the form of encoded features of different channels. In this way, the encoder 300 avoids loss of information as may occur in traditional approaches that use striding and pooling layers. In any case, the output of the encoder 300 is, in one approach, a feature map having a particular dimension (e.g., 512×H/32×W/32) that is transformed in relation to the image 250 (e.g., 3×H×W) as a function of the various encoding layers packing the features into additional channels.

The depth model 260 further includes the decoder 310. In one embodiment, the decoder 310 unfolds (i.e., adapt dimensions of the tensor to extract the features) the previously encoded spatial information in order to derive the depth map 270 according to learned correlations associated with the encoded features. That is, the decoding layers generally function to up-sample, through sub-pixel convolutions and other mechanisms, the previously encoded features into the depth map 270. In one embodiment, the decoding layers comprise unpacking blocks, two-dimensional convolutional layers, and inverse depth layers that function as output layers for different scales. As previously noted, the disclosed architecture of the encoder 300 includes packing blocks that fold encoded features into additional channels in order to preserve spatial information across the separate layers.

In addition to folding the encoded features into the additional channels, the encoder 300 directly provides residual information to the decoder via skip connections 320. While illustrated as a single connection between the encoder 300 and the decoder 310, in practice, the skip connections 320 are, for example, between multiple layers (e.g., four or more) of the encoder 300 and the decoder 310 in order to convey higher resolution encoded information between the encoder 300 and the decoder 310 thereby facilitating a flow of information (e.g., feature maps and gradients) to improve the depth map 270 (e.g., increase available detail). By way of example, consider Table I, which illustrates one example configuration of layers for the depth model 260.

As shown in Table I, the depth model 260 includes encoding layers of the encoder 300, decoding layers of the decoder 310, and various output scales for the depth map 270. Table I indicates the skip connections 320 via reference to outputs of the encoding layers within the decoding layers. In Table I, numbers in parentheses indicate input layers, with "+" as a concatenation in the channel dimension. For example, in one approach, five separate 2D convolutional layers of the decoder 310 are shown as accepting inputs from different layers (e.g., layers 0, 3, 5, 7, 9) of the encoder 300 and are connected via the skip connections 320. Moreover, while Table I illustrates twenty-five separate layers, it should be appreciated that each individual layer may include additional sublayers that are not explicitly identified. Additionally, in alternative approaches, the particular number of layers may vary according to the implementation (e.g., fewer than shown).

TABLE I

| # | Layer Description | K | D | Output Tensor Dim. |
|---|---|---|---|---|
| 0 | Input RGB image | | | 3 × H × W |
| | Encoding Layers | | | |
| 1 | Conv2d | 5 | — | 64 × H × W |
| 2 | Conv2d | 7 | — | 64 × H × W |
| 3 | Packing | 3 | — | 64 × H/2 × W/2 |
| 4 | ResidualBlock (x2) | 5 | — | 64 × H/2 × W/2 |
| 5 | Packing | 3 | 8 | 64 × H/4 × W/4 |
| 6 | ResidualBlock (x2) | 3 | — | 128 × H/4 × W/4 |
| 7 | Packing | 3 | 8 | 128 × H/8 × W/8 |
| 8 | ResidualBlock (x3) | 3 | — | 256 × H/8 × W/8 |
| 9 | Packing | 3 | 8 | 256 × H/16 × W/16 |
| 10 | ResidualBlock (x3) | 3 | — | 512 × H/16 × W/16 |
| 11 | Packing | 3 | 8 | 512 × H/32 × W/32 |
| | Decoding Layers | | | |
| 12 | Unpacking | 3 | 8 | 512 × H/16 × W/16 |
| 13 | Conv2d (9 + 12) | 3 | — | 512 × H/16 × W/16 |
| 14 | Unpacking | 3 | 8 | 256 × H/8 × W/8 |
| 15 | Conv2d (7 + 14) | 3 | — | 256 × H/8 × W/8 |
| 16 | InvDepth (15) | — | — | 4 × H/8 × W/8 |
| 17 | Unpacking | 3 | 8 | 128 × H/4 × W/4 |
| 18 | Conv2d (5 + 17 + Upsample(16)) | 3 | — | 128 × H/4 × W/4 |
| 19 | InvDepth (18) | — | — | 4 × H/4 × W4 |
| 20 | Unpacking | 3 | 8 | 64 × H/2 × W/2 |
| 21 | Conv2d (3 + 20 + Upsample(19)) | 3 | — | 64 × H/2 × W/2 |
| 22 | InvDepth (21) | — | — | 4 × H/2 × W/2 |
| 23 | Unpacking | 3 | 8 | 64 × H × W |
| 24 | Conv2d (0 + 23 + Upsample(22)) | 3 | — | 64 × H × W |
| 25 | InvDepth (24) | — | — | 4 × H × W |
| | Inverse Depth Output Scales | | | |
| #4 | Depth2Space (16) | — | — | 1 × H/4 × W/4 |
| #3 | Depth2Space (19) | — | — | 1 × H/2 × W/2 |
| #2 | Depth2Space (22) | — | — | 1 × H × W |
| #1 | Depth2Space (25) | — | — | 1 × 2H × 2W |

In any case, the Conv2d layers generally include GroupNorm, which is an alternative to batch normalization (BN) that divides channels into groups and computes within the separate groups G, a mean and a variance for normalization, with G=16 and ELU non-linearities. InvDepth layers include a 2D convolutional layer with K=3 and sigmoid non-linearities. The residual block layers include, in one embodiment, a sequence of three distinct 2D convolutional layers with K=3/3/1 and exponential linear unit (ELU) non-linearities followed by GroupNorm with G=16 and a dropout probability of 0.5 in a final layer, which facilitates avoiding overfitting by randomly dropping units (i.e., nodes and associated connections) from the model 260 during training at the noted probability. In one embodiment, Upsample is a 2-factor resizing operation with nearest-neighbor interpolation.

Figure 4:
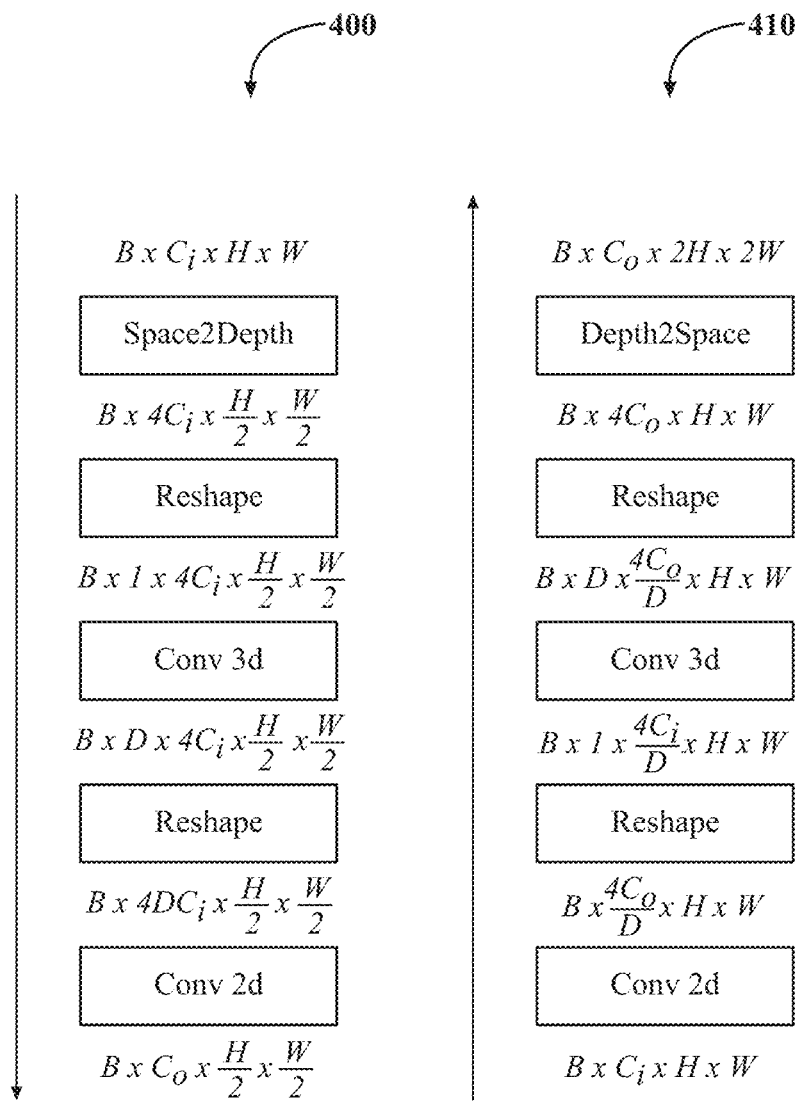
FIG. 4 illustrates a diagram of one embodiment of a packing block and an unpacking block of a depth model.

As an additional explanation of the depth model 260 and, in particular, the packing and unpacking blocks, consider FIG. 4. FIG. 4 illustrates one example of a packing block 400 and an unpacking block 410. Both the packing block 400 and the unpacking block 410 include additional sublayers or routines. For example, the packing block 400 includes a Space-to-Depth layer, a first reshaping layer, a three-dimensional (3D) convolutional layer, a second reshaping layer, and a 2D convolutional layer. By contrast, the unpacking block 410 includes, in one embodiment, a 2D convolutional layer, a first reshaping layer, a 3D convolutional layer, a second reshaping layer, and a Depth-to-Space layer. The packing block 400 and the unpacking block 410 are repeated throughout the encoder 300 and decoder 310 as previously shown in Table I. Of course, in alternative arrangements, the depth model 260 may include a different number of iterations of the packing block 400 and the unpacking block 410.

In either case, the packing block 410, in one embodiment, functions to fold spatial dimensions of intermediate convolutional feature maps into extra channels, thereby capturing sub-pixel information across the encoding layers to retain details of the original image 250. The packing block 410, as shown in relation to the depth model 260, replaces, in one approach, striding and pooling layers by implementing the Space-to-Depth layer followed by the 3D convolutional layer. The Space-to-Depth layer itself, in one embodiment, functions to fold the additional channels into the intermediate feature map via sub-pixel convolutions. Thus, the Space-to-Depth layer, in combination with the 3D convolutional layer, function to aggregate packed feature maps and process spatial information folded into the extra channels. For example, the packing block 410 achieves this by reshaping an input (e.g., an intermediate feature map from a prior layer) to produce a new channel that is subsequently concatenated back into an original channel after processing. The 2D convolutional layer then reduces the aggregated feature map to a desired number of output channels. In this way, the packing block 400 better retains encoded features during the encoding process in contrast to other lossy approaches.

The unpacking block 410, in one embodiment, functions to unfold convolutional feature channels from the encoding layers into spatial dimensions thereby leveraging sub-pixel convolutions of the Depth-to-Space layer for the preservation of details in the output depth map 270. The unpacking block 410 leverages the Depth-to-Space layer as a replacement of, for example, convolutional feature up-sampling. The Depth-to-Space layer provides for a sub-pixel convolution operation that super-resolves output depth maps, and is combined with an additional 3D convolutional operation in the unpacking block 410 to further aggregate information across the decoding layers. That is, the Depth-to-Space operation functions to unfold information from packed feature channels into spatial dimensions thereby providing a larger but shallower output that effectively super-resolves the depth estimates. The 2D convolution of the unpacking block 410 functions to provide a requisite number of feature channels for the subsequent 3D convolutional layer. Arranging the 2D and 3D convolutions in this manner permits the 3D convolution to fully exploit packed spatial information by promoting feature aggregation across all three dimensions. The resulting feature maps may then be super-resolved to a target dimension/scale for output as the depth map 270.

As an additional characteristic of producing the depth map 270, the depth module 220 generally employs the depth model 260 to produce the depth map 270 as an inverse mapping having inverse values for the depth estimates. That is, instead of providing plain depth data, the depth module 220 implements the depth model 260 to provide the depth estimates in an inverse form. Thus, depth module 220 may subsequently invert the values of the depth map 270 to provide the depth values or the image module 230 may separately invert the depth map 270 to generate depth estimates. Moreover, the depth module 220 may also selectively output the depth map 270 from the depth model 260 at different points in processing in order to provide the depth map 270 at different scales. Four separate examples of the different scales are shown in Table I. However, it should be appreciated that the depth module 220, in alternative arrangements, can provide the depth map 270 from the model 260 at different scales than those that are noted.

Additionally, the depth module 220, in one or more embodiments, provides, for example, the depth map 270 at the different scales separately to different systems in the vehicle 100 via the image module 230. That is, separate systems may function on finer or coarser resolutions of depth information depending on a particular task that is undertaken. Accordingly, the depth module 220 can separately provide the different scales to the various systems and/or omit subsequent processing where a fuller resolution form of the depth map 270 is not required. As such, the depth module 220 generally provides a robust implementation for resolving depth estimates that can be adapted to different systems.

Figure 3:
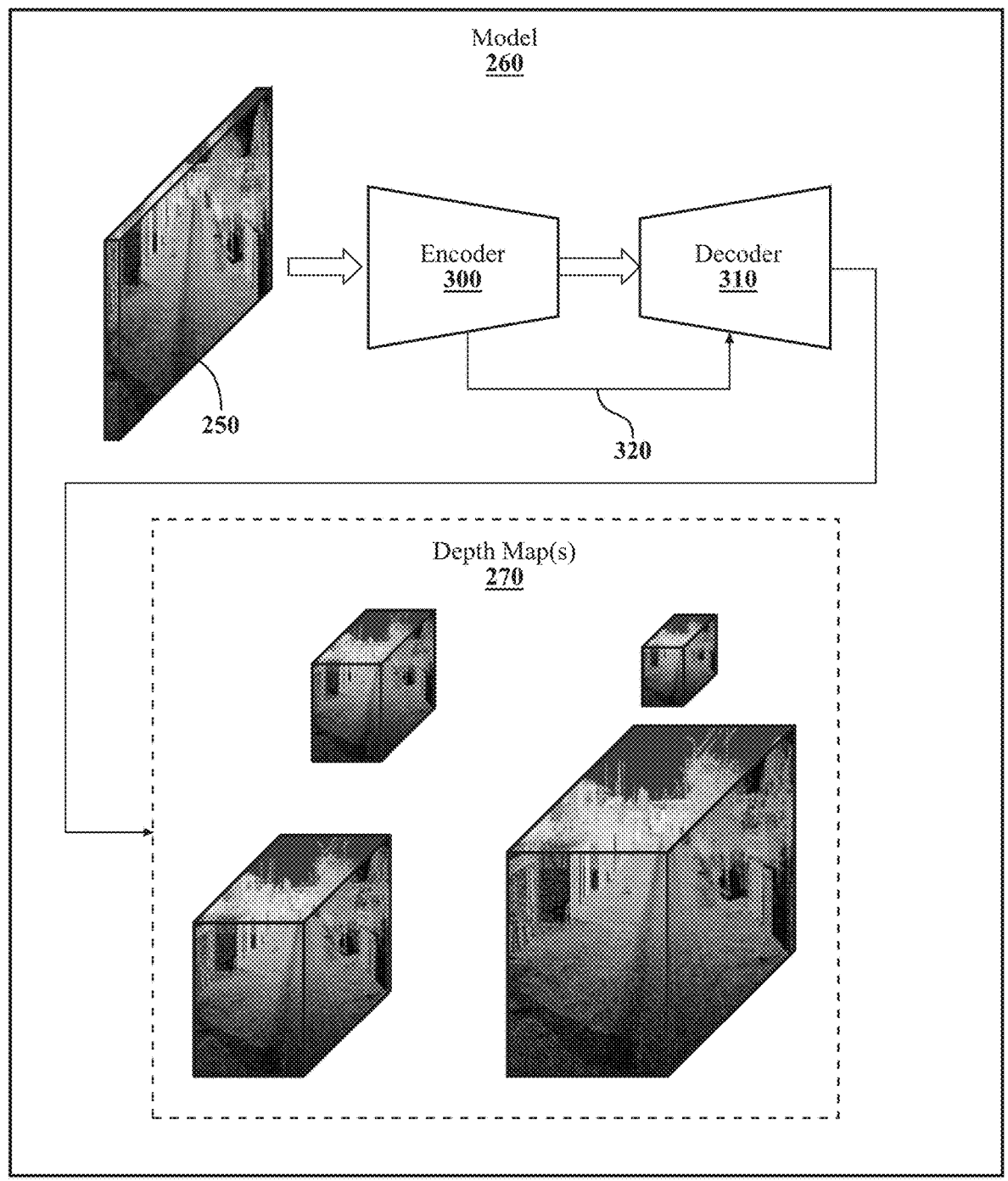
FIG. 3 illustrates one embodiment of a depth model as may be employed by the depth system of FIG. 2.

As an additional note, while the depth model 260 in FIG. 3 is shown as a discrete unit separate from the depth system 170, the depth model 260 is, for example, generally integrated with the depth module 220. That is, the depth module 220 functions to execute various processes of the depth model 260 and use various data structures of the depth model 260 in support of such execution. Accordingly, in one embodiment, the depth module 220 includes instructions that function to control the processor 110 to generate the depth map 270 using the depth model 260 as disclosed.

Moreover, referring back to FIG. 2, in one embodiment, the image module 230 generally includes instructions that function to control the processor 110 to execute various actions in support of the depth module 220. For example, in one embodiment, the image module 230 receives the monocular image 250 from the camera 126 and provides the image 250 to the depth module 220. The image module 230, in one or more approaches, receives the image 250 by controlling the camera 126 to capture the image 250, by passively acquiring the image 250 from a data bus or electronic memory, and so on. The image module 230 may also perform pre-processing on the image 250 to provide the image 250 in a format that is accepted by the depth model 260.

In further approaches, the image module 230 handles outputs from the depth module 220/model 260. That is, the image module 230 includes instructions to, for example, perform one or more post-processing routines, provide the depth map 270 to additional systems/modules in the vehicle 100 in order to control the operation of the modules and/or the vehicle 100 overall, and so on. In still further aspects, the image module 230 communicates the depth map 270 to a remote system (e.g., cloud-based system) as, for example, a mechanism for mapping the surrounding environment or for other purposes (e.g., traffic reporting, etc.). As one example, the image module 230 uses the depth map 270 to map locations of obstacles in the surrounding environment and plan a trajectory that safely navigates the obstacles. Thus, the image module 230, in one embodiment, uses the depth map 270 to control the vehicle 100 to navigate through the surrounding environment.

In further aspects, the image module 230 conveys the depth map 270 to further internal systems/components of the vehicle 100 such as the autonomous driving module 160. By way of example, in one arrangement, the image module 230 acquires the depth map 270 and conveys the depth map 270 to the autonomous driving module 160 in a particular scale that the module 160 accepts as an electronic input. In this way, the depth system 170 informs the autonomous driving module 160 of the depth estimates to improve situational awareness and planning of the module 160. As such, the module 160 may acquire the depth map 270 as a primary source of depth information for the surrounding environment or, in one approach, as a secondary source that verifies other means (e.g., LiDAR data). It should be appreciated that the autonomous driving module 160 is indicated as one example, and, in further arrangements, the image module 230 may provide the depth map 270 to the module 160 and/or other components in parallel or as a separate conveyance.

Furthermore, in one embodiment, the image module 230 includes instructions to train the depth model 260. The image module 230, in one embodiment, trains the depth model 260 using a self-supervised structure from motion (SfM) process. Thus, to initiate the depth model 260, the image module 230 uses images from video of a scene and formulates the generation of the depth map 270 as a photometric error minimization across the images. In general, the image module 230 trains the depth model 260 by causing the depth module 220 to execute the depth model 260 as though typical operation is underway, however, the image module 230 provides one of the images from the video as the monocular image 250 for processing.

As such, the image module 230 uses the resulting map 270 to synthesize the matching image of the pair from video in combination with a rigid-body transformation (e.g., 6-DoF SE(3)). Thus, in addition to the depth model 260, the depth system 170, in one approach, implements a further machine learning algorithm in the form of a pose network that generates the rigid-body transformation according to the noted images (i.e., two images of the same scene from the video). The pose network is, for example, a convolutional neural network. The image module 230 can then compare the synthesized image and the original image 250 to determine an error, which is embodied as, for example, the photometric loss. This loss characterizes an accuracy of the depth model 260 in producing the depth map 270. Thus, the image module 230 can then use the calculated loss to adjust the depth model 260 thereby training the model 260 to produce depth estimates.

In general, the image module 230 trains the depth model 260 over a training data set of monocular video sequences that are generally comprised of many separate images. Through the process of training the model 260, the image module 230 adjusts various hyper-parameters in the model 260 to fine-tune the functional blocks included therein. Accordingly, the image module 230 trains the encoder 300 and the decoder 310 including the various packing and unpacking blocks included therein. Moreover, the image module 230, in one approach, further implements a generative neural network or other algorithm to synthesize the matching image from the depth map 270 and the rigid-body transform. In various approaches, the generative network can be integrated as part of the depth model 260 or implemented in a standalone configuration. In either case, the image module 230 trains the model 260 in a self-supervised approach through the use of pairs of monocular images from video, and, in a further arrangement, also trains the pose network in combination using the photometric loss as at least part of a loss function to adapt the pose network.

Through this training process, the model 260 develops a learned prior of the monocular images as embodied by the internal parameters of the model 260 from the training on the images. In general, the model 260 develops the learned understanding about how depth relates to various aspects of an image according to, for example, size, perspective, and so on. Consequently, the resulting trained depth model 260 is leveraged by the depth system 170 to estimate depths from monocular images that do not include an explicit modality identifying the depths.

Figure 5:
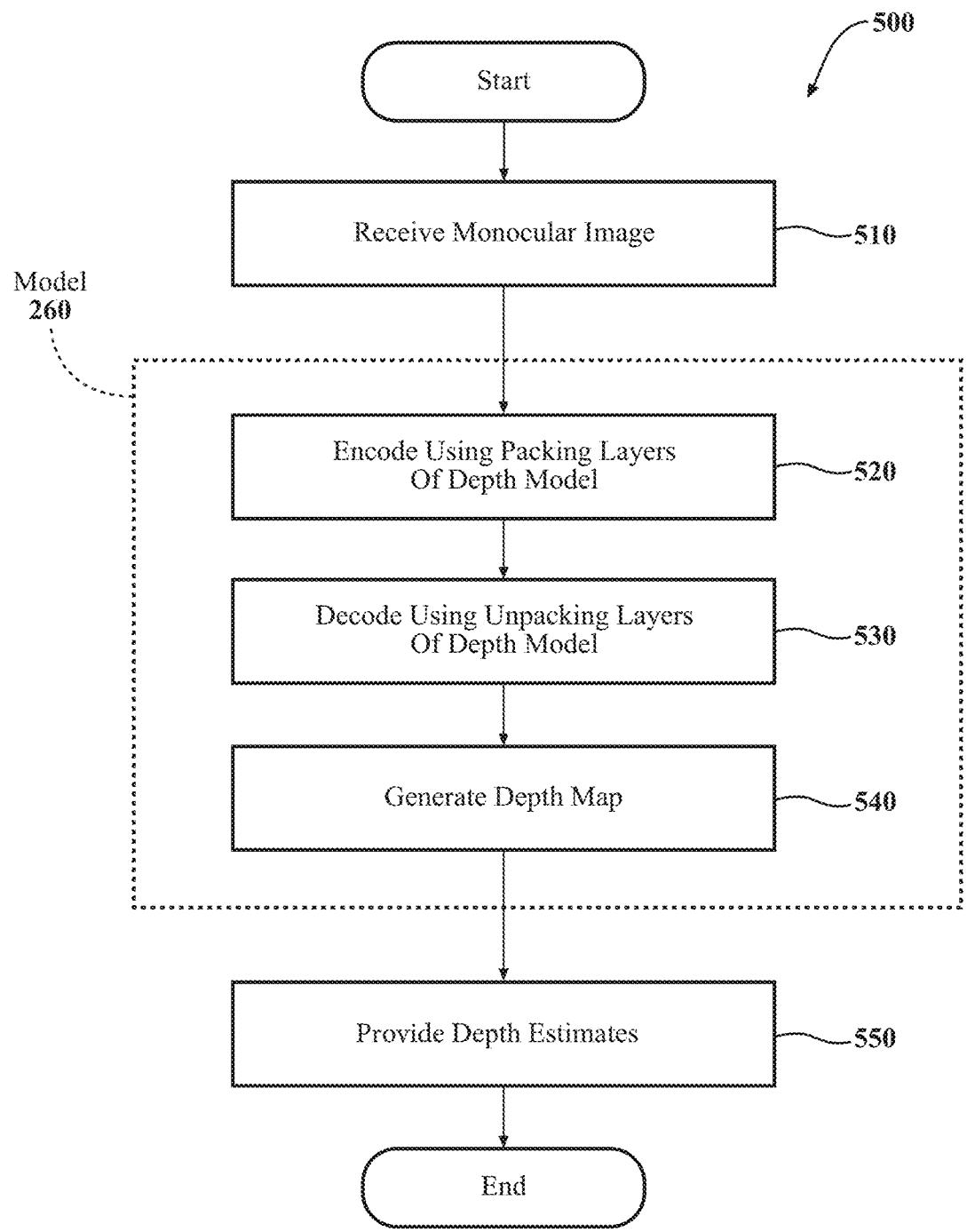
FIG. 5 illustrates a flowchart of one embodiment of a method associated with estimating depths within a surrounding environment from a monocular image.

Additional aspects of generating depth estimates from monocular images will be discussed in relation to FIG. 5. FIG. 5 illustrates a flowchart of a method 500 that is associated with using a depth model including at least an encoder with packing blocks and a decoder with unpacking blocks to estimate depths from a single monocular image. Method 500 will be discussed from the perspective of the depth system 170 of FIGS. 1-2. While method 500 is discussed in combination with the depth system 170, it should be appreciated that the method 500 is not limited to being implemented within the depth system 170 but is instead one example of a system that may implement the method 500.

At 510, the image module 230 acquires the monocular image 250. In one embodiment, the image module 230 acquires the monocular image 250 locally from co-located systems with the depth system 170 (e.g., the camera 126), while in further embodiments, the image module 230 may acquire the image 250 through a communication link with a remote system. Thus, while the depth system 170 can be implemented within a particular device that is, for example, actively navigating an environment, the depth system 170 may also function as a cloud-based computing service to analyze monocular images for depth information or as a statically mounted device in an environment (e.g., mounted to a traffic signal).

As previously described, the monocular image 250 itself may have different characteristics according to different implementations but generally is a single image that does not include explicit depth information. As an additional note, the method 500 is illustrated with a bounding box around blocks 520, 530, and 540 that indicates which aspects of the method are, in one embodiment, being performed by the depth model 260 itself. That is, the bounding box indicates which functions are internal functions of the depth model 260.

At 520, the depth module 220 encodes the monocular image 250 according to encoding layers of the depth model 260. As previously described, the encoder 300 of the depth model 260 includes multiple separate layers arranged in succession that function, when executed by the depth module 220, to iteratively encode the monocular image 250 to generate feature maps at successively refined representations. In other words, the encoder 300 initially accepts the monocular image 250 as an electronic input and then proceeds to iteratively encode features represented therein across the separate encoding layers. Thus, the encoding layers generate successively refined intermediate feature maps across the layers.

In particular, the packing blocks distributed among the encoding layers function to fold spatial dimensions of the feature maps into additional channels to capture sub-pixel information across the packing blocks thereby aggregating features in the feature maps instead of prior-encoded features being lost to subsequent encoding operations. As previously explained, the packing blocks capture the features by adding channels to an intermediate feature map using a space-to-depth operation and one or more further functions of the packing block. In this way, the packing block functions to preserve information throughout the encoding process, which subsequently provides for improved detail in the generated depth map 270.

At 530, the depth module 220 decodes the feature maps according to decoding layers of the depth model 260. In one embodiment, the decoder 310, as executed by the depth module 220, iteratively decodes the features maps associated with separate ones of the packing blocks using unpacking blocks of the decoding layers to generate the depth map 270. For example, skip connections between the encoding and decoding layers relay the feature maps (i.e., intermediate encoded maps) such that the decoding layers concatenate the related feature maps with outputs of prior decoding layers and process the concatenated information to produce the depth map 270.

As previously described, the decoding layers, and, in particular, the unpacking blocks unfold feature channels in the feature maps into spatial dimensions and resolve high-level spatial features therefrom to produce the depth map 270. As one aspect of this process, the unpacking blocks implement a depth-to-space operation that unfolds the maps and in combination with a 3D convolutional layer up-samples the maps via sub-pixel convolutions and super-resolves the spatial information.

In other words, the unpacking block applies sub-pixel convolutional transformations that super-resolve high-resolution data from multi-scale low-resolution convolutional features learned by the depth model 260. Accordingly, the depth model 260 uses the detailed information encoded in the extra channels by the packing blocks and high-resolution feature maps relayed by the skip connections to generate improved depth maps at various scales.

At 540, the depth module 220 generates the depth map 270. In one embodiment, the depth module 220 generates the depth map 270 by producing a set of maps at multiple different scales. For example, with reference back to Table I, the depth module 220, in one approach, extracts the different scales of the depth map 270 at different layers of the depth model 260 (e.g., layers 16, 19, 22, 25). That is, during the process of generating a final version of the depth map 270, the depth model 260, in one approach, derives the separate scales by extracting intermediate outputs of the decoding layers. The intermediate outputs are configured in the separate scales. Additionally, the separate depth maps 270 are provided in an inverse form. That is, instead of providing the maps 270 as explicit estimates, the maps 270 include inverse values as a byproduct of the way in which the depth model 260 generates the maps 270.

At 550, the image module 230 provides the depth map 270 as the depth estimates of objects represented in the monocular image 250. As should be appreciated, in one embodiment, the image module 230 electronically provides the map 270 to other systems of the vehicle 100 in support of, for example, autonomous planning and navigation of the vehicle 100. Of course, in further implementations, the image module 230 communicates the map 270 to a remote device that originally provides the image 250 as a response to an original request for depth information. Moreover, as an additional aspect of providing the depth map 270, the image module 230, in one or more embodiments, converts the inverse values into explicit depth estimates prior to communicating the map 270.

In general, the depth system 170 and the depth model 260 can be employed in various contexts in support of active autonomous navigation, scene analysis, metadata analysis (e.g., traffic analysis), and so on. In either case, the approach embodied within the depth system 170 provides a unique and improved approach to leveraging monocular images in order to resolve high-resolution depth data.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A depth system for generating depth estimates of an environment depicted in a monocular image, comprising:
one or more processors;
a memory communicably coupled to the one or more processors and storing:
a depth module including instructions that when executed by the one or more processors cause the one or more processors to, in response to receiving the monocular image, process the monocular image according to a depth model to generate a depth map by:
encoding the monocular image according to encoding layers of the depth model including iteratively encoding features of the monocular image to generate feature maps at successively refined representations using packing blocks within the encoding layers,
decoding the feature maps according to decoding layers of the depth model including iteratively decoding the features maps associated with separate ones of the packing blocks using unpacking blocks of the decoding layers to generate the depth map; and
an image module including instructions that when executed by the one or more processors cause the one or more processors to provide the depth map as the depth estimates of objects represented in the monocular image.

2. The depth system of claim 1, wherein the depth module includes instructions to encode the features including instructions to fold spatial dimensions of the feature maps into additional channels according to the packing blocks to capture sub-pixel information across the encoding layers, and
wherein the depth module includes instructions to encode spatial information of the feature maps and aggregate the features in the feature maps according to the packing blocks.

3. The depth system of claim 2, wherein the depth module includes instructions to encode the feature maps according to the packing blocks including instructions to add channels to an intermediate feature map of the feature maps according to a space-to-depth operation, a three-dimensional convolutional operation, a reshaping operation, and a two-dimensional convolutional operation to generate the intermediate feature map, and
wherein the depth module includes instructions to encode the feature maps according to the space-to-depth operation that adds the additional channels to capture the sub-pixel information.

4. The depth system of claim 1, wherein the depth module includes instructions to decode the feature maps including instructions to relay the feature maps to the unpacking blocks using skip connections between the packing blocks and the unpacking blocks,
wherein the depth module includes instructions to decode the feature maps including instructions to unfold feature channels in the feature maps into spatial dimensions using the decoding layers including the unpacking blocks, and
wherein the depth module includes instructions to relay the feature maps including instructions to provide encoded features from separate ones of the encoding layers as residual information of high-level features in the monocular image to the decoding layers.

5. The depth system of claim 4, wherein the depth module includes instructions to decode according to the unpacking blocks including instructions to, at the separate unpacking blocks, applying a two-dimensional convolutional operation, a three-dimensional convolutional operation, a reshaping operation, and a depth-to-space operation that applies sub-pixel convolutions to up-sample the spatial dimensions and super-resolve spatial information into the depth map, and
wherein the depth module includes instructions to decode the feature maps including instructions to generate intermediate depth maps that provide inverse depths and that are inputs to subsequent ones of the decoding layers.

6. The depth system of claim 1, wherein the depth module includes instructions to generate the depth map including instructions to generate a set of depth maps at multiple different scales,
wherein the set of depth maps are inverse depth maps separately derived from the decoding layers, and
wherein the image module includes instructions to provide the depth map including instructions to provide the depth map to one or more vehicle systems within a vehicle to facilitate automated functions of the vehicle.

7. The depth system of claim 1, wherein the depth model is a machine learning algorithm comprised of the encoder layers and the decoder layers, the encoding layers including convolutional layers, the packing blocks, and residual blocks, and the decoding layers including the unpacking blocks, convolutional layers, and output layers for providing a set of depth maps.

8. The depth system of claim 1, wherein the image module includes instructions to train the depth model using a training algorithm that is self-supervised and accounts for motion of a camera between successive monocular training images in training data using a loss function that accounts for structure from motion (SfM), and
wherein the image module includes instructions to train the depth model including instructions to execute a pose model to account for the motion, and to adjust parameters in the depth model including at least sub-pixel convolutions in the decoding layers and encoding hyper-parameters in the encoding layers.

9. A non-transitory computer-readable medium for generating depth estimates of an environment depicted in a monocular image and including instructions that when executed by one or more processors cause the one or more processors to:
process the monocular image according to a depth model to generate a depth map by:
encoding the monocular image according to encoding layers of the depth model including iteratively encoding features of the monocular image to generate feature maps at successively refined representations using packing blocks within the encoding layers, and
decoding the feature maps according to decoding layers of the depth model including iteratively decoding the features maps associated with separate ones of the packing blocks using unpacking blocks of the decoding layers to generate the depth map; and
provide the depth map as the depth estimates of objects represented in the monocular image.

10. The non-transitory computer-readable medium of claim 9, wherein the instructions to encode the features include instructions to fold spatial dimensions of the feature maps into additional channels according to at least a space-to-depth operation of the packing blocks to capture sub-pixel information across the encoding layers, and wherein the instructions include instructions to encode spatial information of the feature maps and aggregate the features in the feature maps according to the packing blocks.

11. The non-transitory computer-readable medium of claim 9, wherein the instructions to decode the feature maps include instructions to relay the feature maps to the unpacking blocks using skip connections between the packing blocks and the unpacking blocks,
 wherein the instructions to decode the feature maps include instructions to unfold feature channels in the feature maps into spatial dimensions using the decoding layers including at least a depth-to-space operation of the unpacking blocks.

12. The non-transitory computer-readable medium of claim 9, wherein the instructions to generate the depth map include instructions to generate a set of depth maps at multiple different scales,
 wherein the set of depth maps are inverse depth maps separately derived from the decoding layers, and
 wherein the instructions to provide the depth map include instructions to provide the depth map to one or more vehicle systems within a vehicle to facilitate automated functions of the vehicle.

13. The non-transitory computer-readable medium of claim 9, wherein the depth model is a machine learning algorithm comprised of the encoder layers and the decoder layers, the encoding layers including convolutional layers, the packing blocks, and residual blocks, and the decoding layers including the unpacking blocks, convolutional layers, and output layers for providing a set of depth maps.

14. A method of generating depth estimates of an environment depicted in a monocular image, comprising:
 in response to receiving the monocular image, processing the monocular image according to a depth model to generate a depth map by:
  encoding the monocular image according to encoding layers of the depth model including iteratively encoding features of the monocular image to generate feature maps at successively refined representations using packing blocks within the encoding layers,
  decoding the feature maps according to decoding layers of the depth model including iteratively decoding the features maps associated with separate ones of the packing blocks using unpacking blocks of the decoding layers to generate the depth map; and
 providing the depth map as the depth estimates of objects represented in the monocular image.

15. The method of claim 14, wherein encoding the features includes folding spatial dimensions of the feature maps into additional channels according to the packing blocks to capture sub-pixel information across the encoding layers, and
 wherein encoding includes aggregating the features in the feature maps according to the packing blocks.

16. The method of claim 15, wherein encoding the feature maps according to the packing blocks includes adding channels to an intermediate feature map of the feature maps according to a space-to-depth operation, a three-dimensional convolutional operation, a reshaping operation, and a two-dimensional convolutional operation to generate the intermediate feature map, and
 wherein encoding the feature maps according to the space-to-depth operation adds the additional channels to capture the sub-pixel information.

17. The method of claim 14, wherein decoding the feature maps includes relaying the feature maps to the unpacking blocks using skip connections between the packing blocks and the unpacking blocks,
 wherein decoding the feature maps includes unfolding feature channels in the feature maps into spatial dimensions using the decoding layers including the unpacking blocks, and
 wherein relaying the feature maps includes providing encoded features from separate ones of the encoding layers as residual information of high-level features in the monocular image to the decoding layers.

18. The method of claim 17, wherein decoding according to the unpacking blocks includes, at the separate unpacking blocks, applying a two-dimensional convolutional operation, a three-dimensional convolutional operation, a reshaping operation, and a depth-to-space operation that applies sub-pixel convolutions to up-sample the spatial dimensions and super-resolve spatial information into the depth map, and
 wherein decoding the feature maps includes to generate intermediate depth maps that provide inverse depths and that are inputs to subsequent ones of the decoding layers.

19. The method of claim 14, wherein generating the depth map includes instructions to generate a set of depth maps at multiple different scales,
 wherein the set of depth maps are inverse depth maps separately derived from the decoding layers, and
 wherein the depth model is a machine learning algorithm comprised of the encoder layers and the decoder layers, the encoding layers including convolutional layers, the packing blocks, and residual blocks, and the decoding layers including the unpacking blocks, convolutional layers, and output layers for providing the set of depth maps.

20. The method of claim 14, further comprising:
 training the depth model using a training algorithm that is self-supervised and accounts for motion of a camera between successive monocular training images in training data using a loss function that accounts for structure from motion (SfM),
 wherein training the depth model includes executing a pose model to account for the motion, and adjusting parameters in the depth model including at least sub-pixel convolutions in the decoding layers and encoding hyper-parameters in the encoding layers.

\* \* \* \* \*